Nov. 8, 1932.  W. D. WRIGHT  1,887,388
FRUIT PACKER
Filed Jan. 28, 1931   7 Sheets-Sheet 1
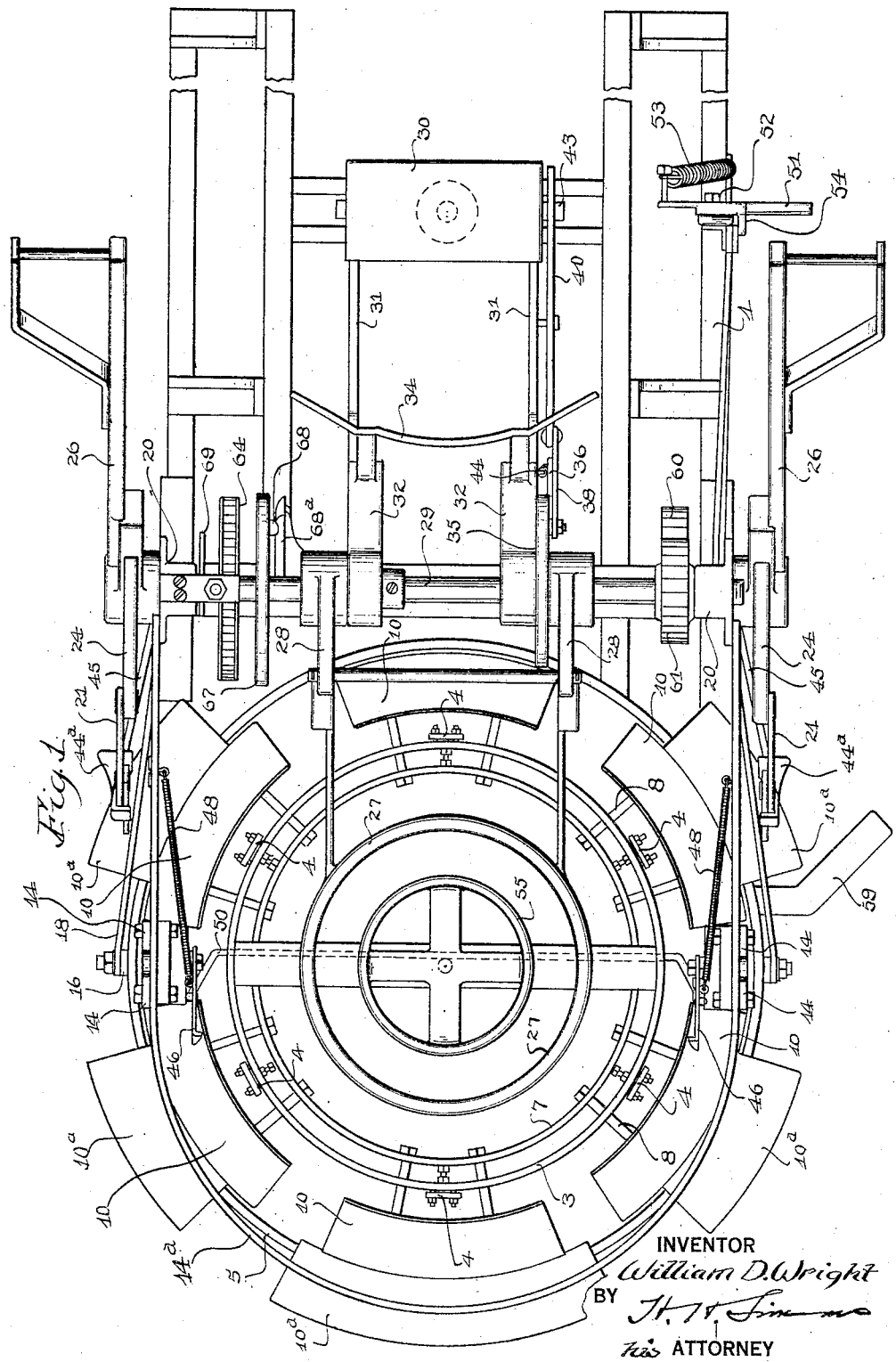
INVENTOR
William D. Wright
BY
His ATTORNEY

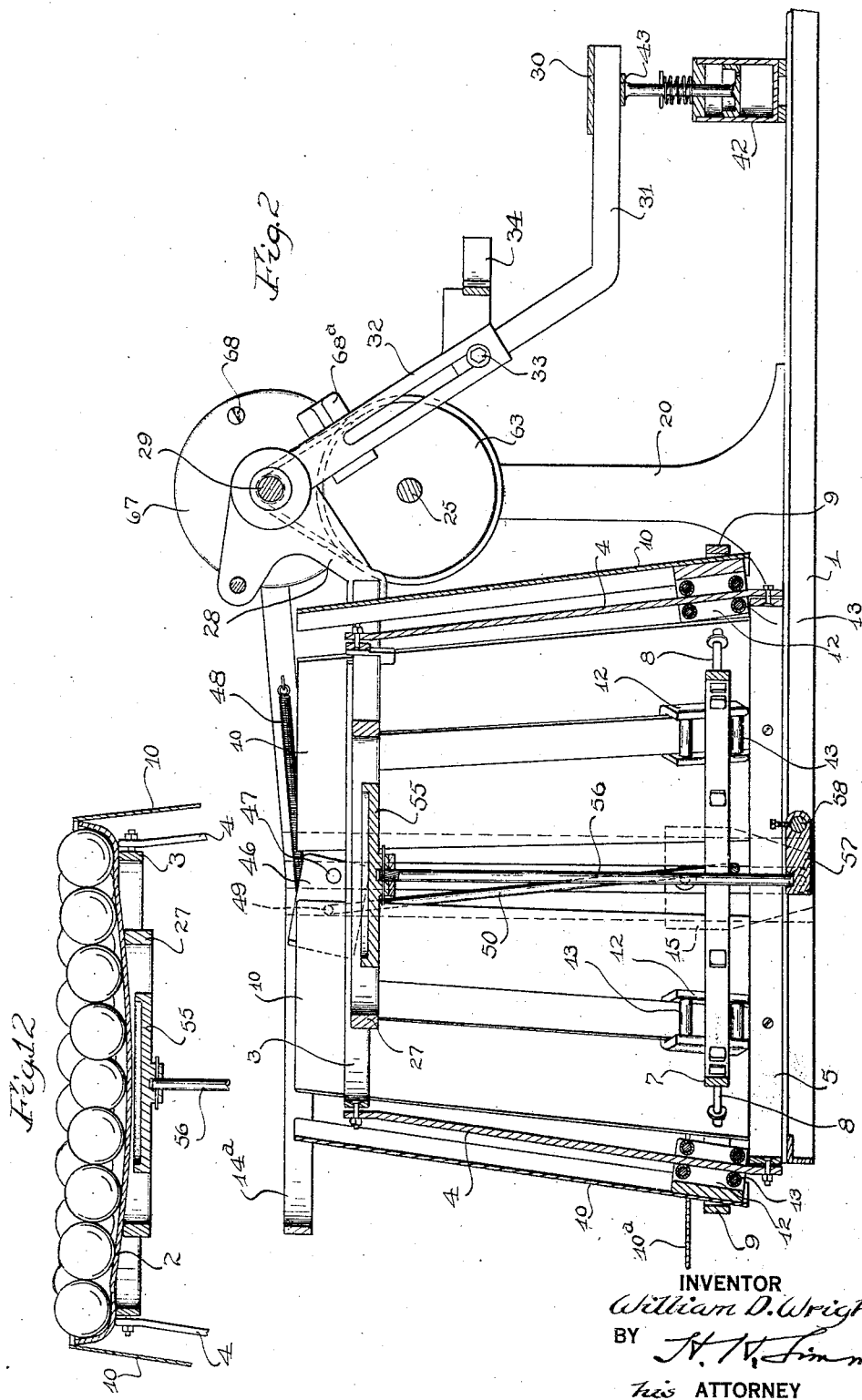

Nov. 8, 1932.  W. D. WRIGHT  1,887,388
FRUIT PACKER
Filed Jan. 28, 1931   7 Sheets-Sheet 3
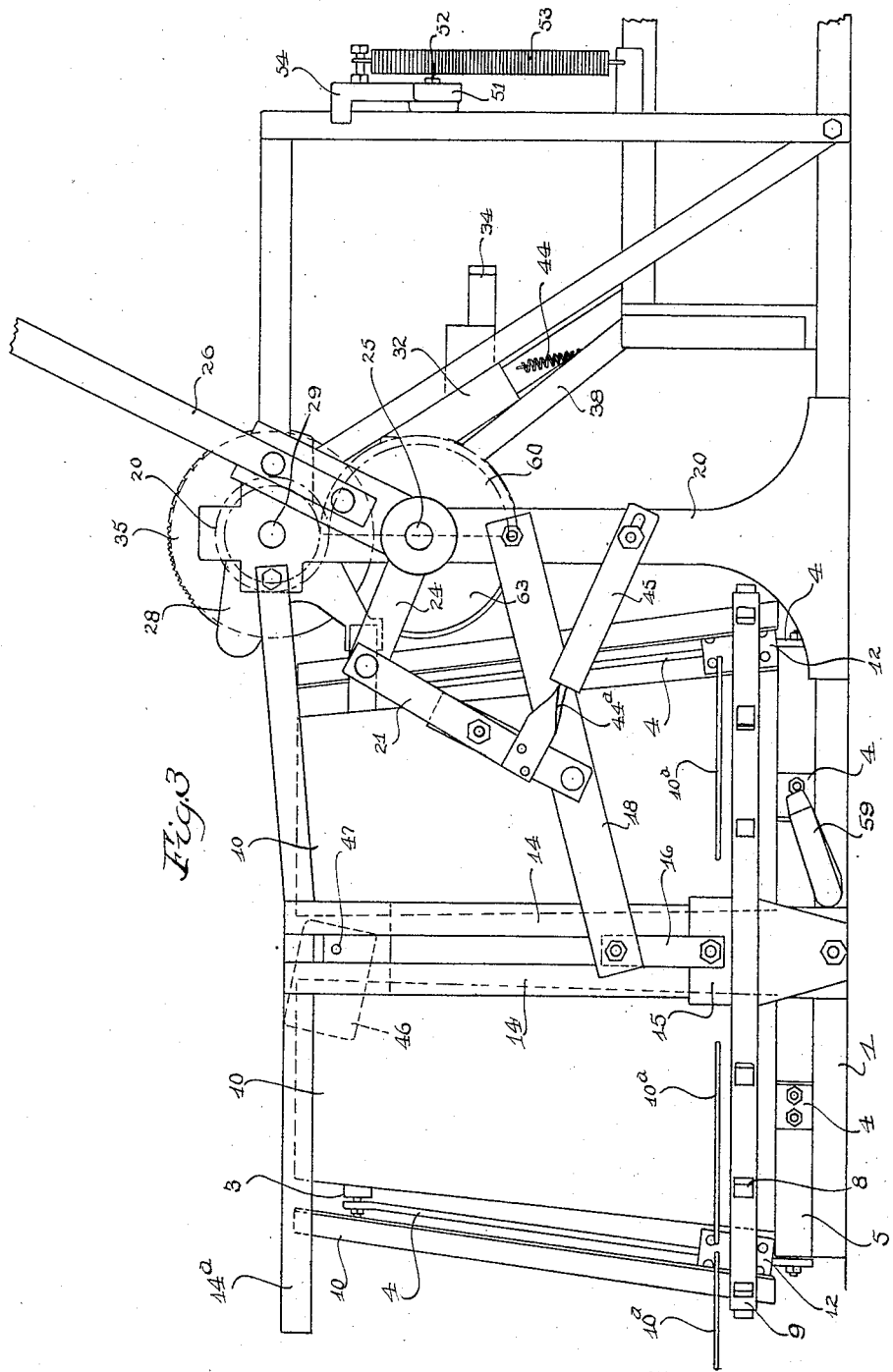
INVENTOR
*William D. Wright*
BY *J. H. V. Simms*
His ATTORNEY

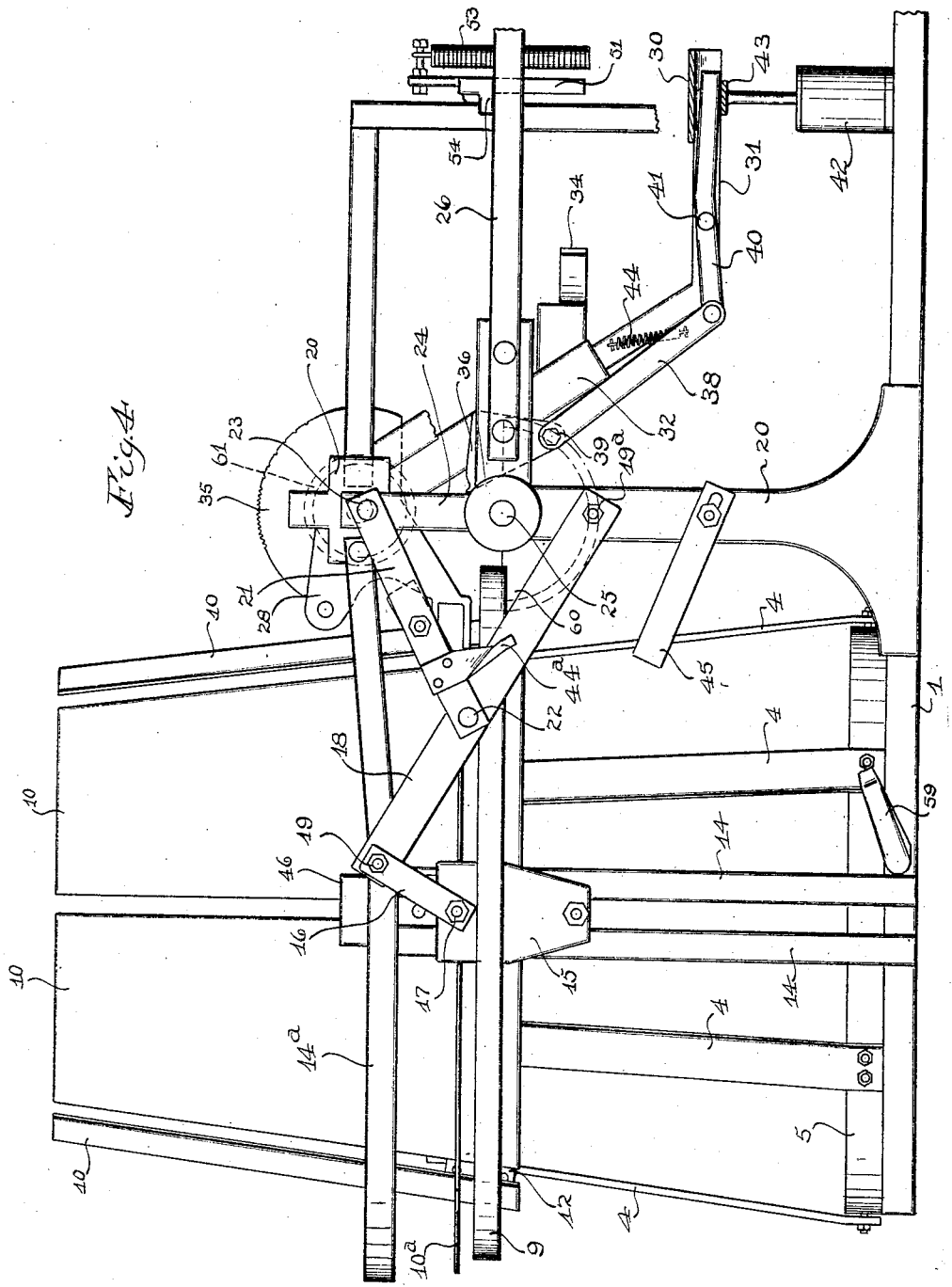

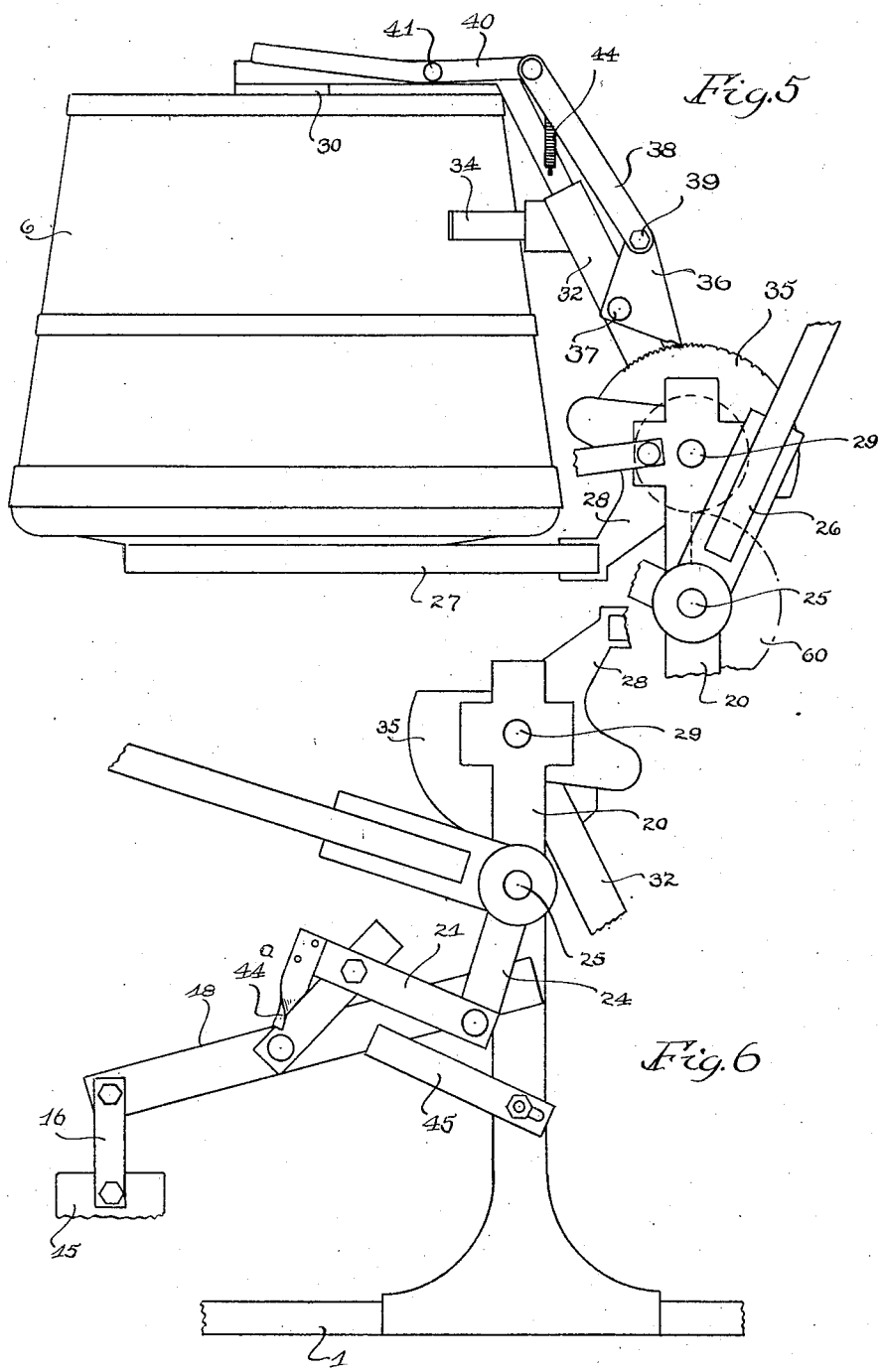

Nov. 8, 1932.                W. D. WRIGHT                1,887,388
                              FRUIT PACKER
                    Filed Jan. 28, 1931        7 Sheets-Sheet 6
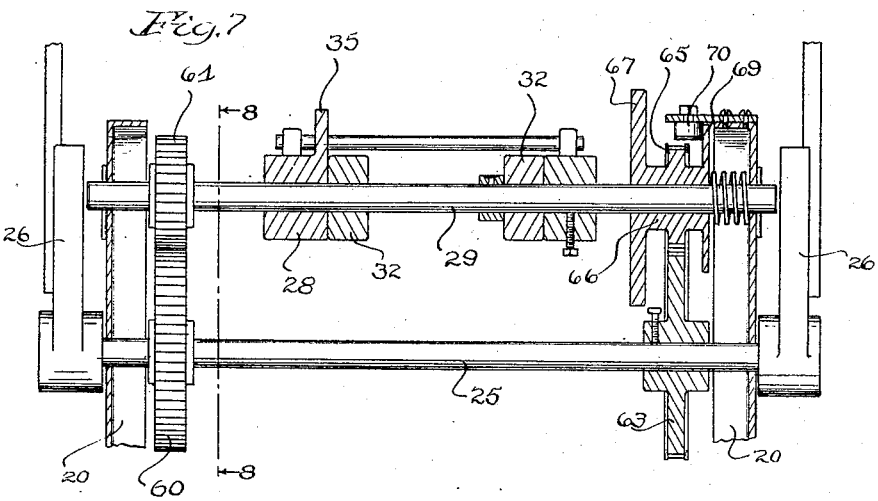
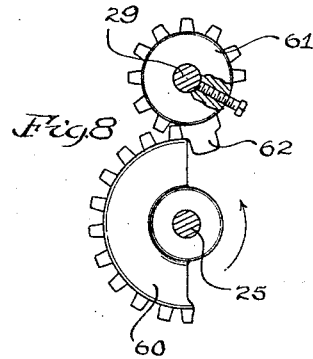
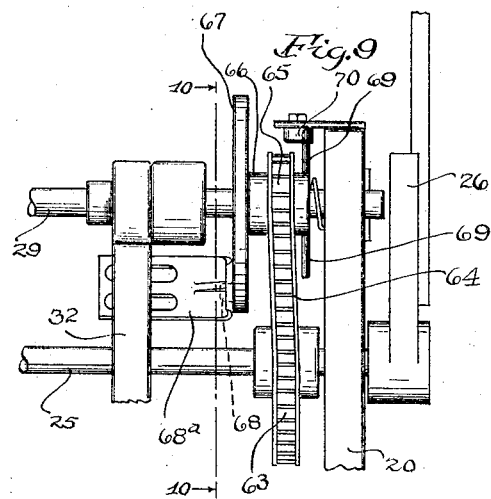
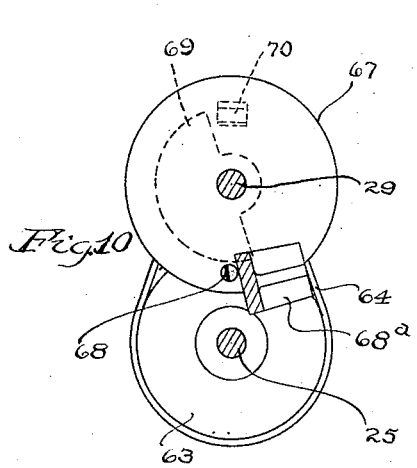
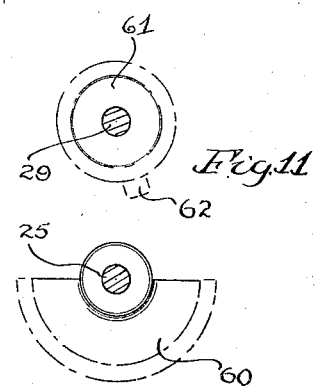
INVENTOR
William D. Wright
BY
his ATTORNEY

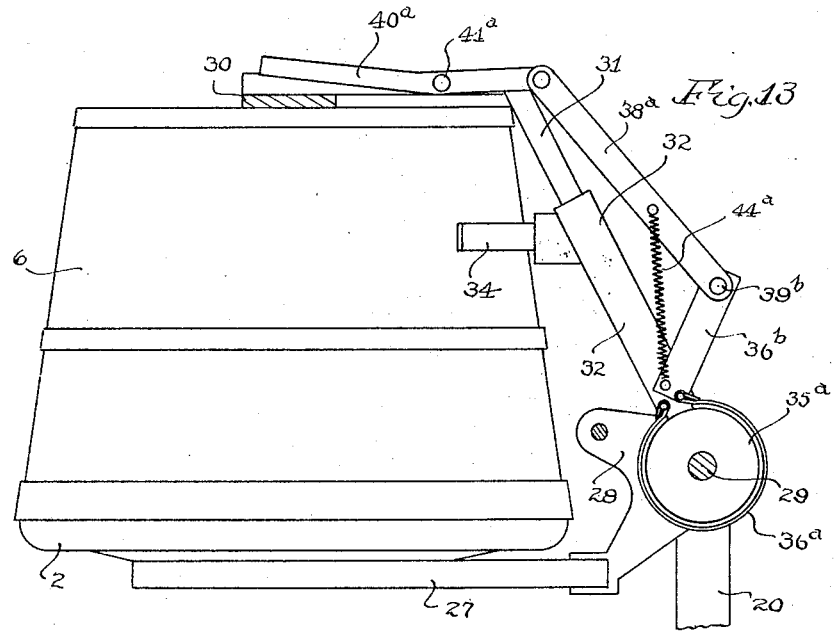
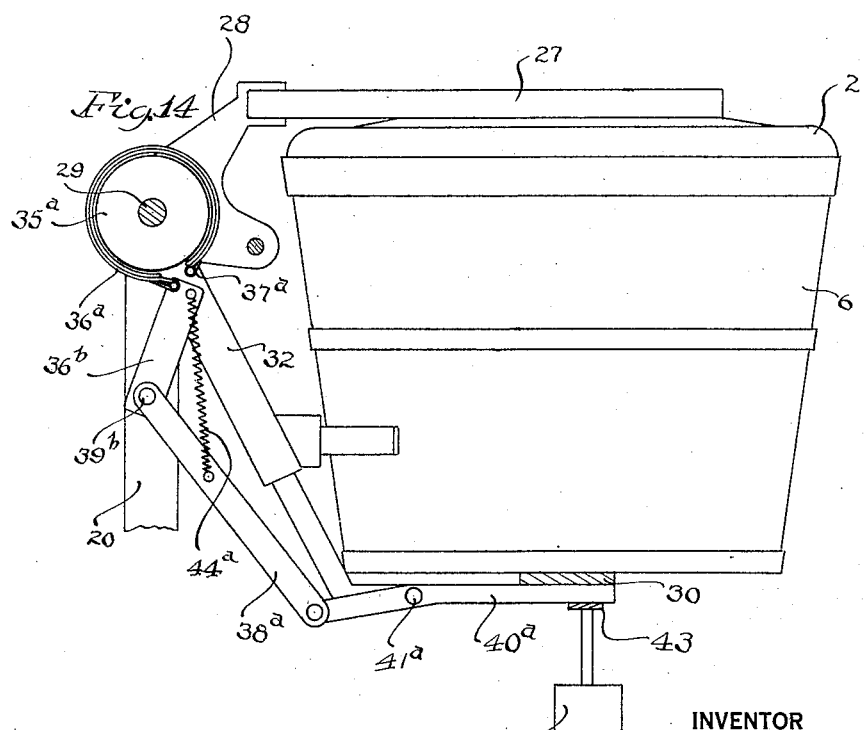

Patented Nov. 8, 1932

1,887,388

UNITED STATES PATENT OFFICE

WILLIAM D. WRIGHT, OF BROCKPORT, NEW YORK

FRUIT PACKER

Application filed January 28, 1931. Serial No. 511,830.

The present invention relates to fruit packers and more particularly to the type in which a column of fruit is built up on a facing member or plate and is encased within a basket or receptacle fitted in an inverted position over the faced fruit column and then uprighted with the facing member to settle the fruit within the basket. An object of this invention is to provide a novel manner of supporting the facing plate or member. Another object is to provide a novel means of operating the confining means for the column of fruit built up on the facing member. Still another object is to provide a novel means of limiting the descent of the basket or container over the confining means to prevent injury to the fruit and to the confining means. A further object of the invention is to improve the uprighting mechanism for the inverted basket over a column of fruit on the facing member. A still further object of the invention is to provide for operating the holding means of the uprighting means from an operator which effects the swinging of a support for a facing member during the time that the facing member support is stationary, and supporting a column of fruit. Another and further object of the invention is to provide means for shifting a holding member of an uprighting means to holding position by means of a single operator which also effects the operation of the column confining means and the movement of a member which supports the facing member during the uprighting action.

To these and other ends, the invention consists of certain parts and combinations of parts all of which will be hereinafter described: the novel features being pointed out in the appended claims.

In the drawings:

Fig. 1 is a plan view of a fruit packer embodying the present invention;

Fig. 2 is a vertical section through the machine showing the confining means in lowered position;

Fig. 3 is a side view of the packer with the confining means in lowered position preparatory to the beginning of a packing operation;

Fig. 4 is a side view of the machine showing the parts in the positions they occupy during the forming of the column of fruit on the facing member, and also at the time of the completion of the column just prior to the fitting of the basket or receptacle over the confining means;

Fig. 5 is a fragmentary side view showing a filled inverted basket held by the uprighting means just prior to the uprighting operation;

Fig. 6 is a fragmentary view showing the position of the operating mechanism when it has been moved to shift the facing plate support of the uprighting means to a position within the main face plate support;

Fig. 7 is a vertical section in the plane of the two shafts of the operating mechanism;

Fig. 8 is a section on the line 8—8, Fig. 7;

Fig. 9 is a fragmentary view of the clutch or lost motion connection between the facing plate support and the holding member of the uprighting means;

Fig. 10 is a section on the line 10—10, Fig. 9;

Fig. 11 is another view of the lost motion connection shown in Fig. 8 in another position;

Fig. 12 is a fragmentary section showing the position of the facing member or plate while the facing is taking place;

Fig. 13 is a modification of the locking means for two clamping arms for uprighting the inverted filled basket; and Fig. 14 is another view of the modification showing the position of the parts after the basket has been shifted to its upright position.

In the illustrated embodiment of the invention, 1 indicates a base on which is supported supporting means for a facing member 2. The supporting means, in this instance, comprises a ring 3 and converging uprights 4 secured at their lower ends to a base ring 5 on the base and at their upper ends to the facing member supporting ring 3. The ring 3 is of less diameter than the facing member, so that the latter extends beyond the ring 3.

The fruit or other articles to be packed are first faced on the facing member 3 either on or off the support and then a column of fruit sufficient to fill a receptacle such as a basket 6 is built up on the facing layer. This is effected, in this instance, by a confining means comprising an inner ring 7 connected by radial bolts 8 with an outer ring 9, one inside the converging uprights 4 and the other outside said uprights, the two rings with their connecting bolts forming a common connection for a plurality of confining segments 10 which, when in their lowest positions, have their upper ends substantially on a level with the outer edge of the facing member, and which, when in their uppermost positions, project above the facing plate and provide a compartment in which the fruit to be packed may be built into a column. Adjacent the lower edges of these plates are outwardly projecting fenders or guards 10a which will direct the articles falling from the confining means away from the machine.

In order that the segmental confining plates may move on lines which are parallel with the taper of the side walls of the basket 6, the plates are movable laterally on the common connector and, to this end, the plates have openings through which the rods or bolts 8 pass. To insure this lateral or sidewise movement of the confining plates on their guide rods during the raising and the lowering of the plates, each plate carries a yoked block with roller bearings 13 engaging opposite sides of the converging uprights 4, so that the latter have the dual function of supporting the ring 3 and the facing plate and acting as converging guides for effecting the lateral movement of the confining plates.

The support for the confining plates, in this instance, is mounted for vertical movement on the base, and to this end, upright guides 14 are provided on the base on opposite sides of the plate support and are connected with the standards 20 by a U shaped frame 14a. On these guides move guide blocks 15, secured to the plate support 1. Movement of the confining means may be effected by links 16 pivoted to the blocks 15 and 17, and having swinging arms 18 pivoted thereto at 19. These swinging arms 18 are also pivoted at 19a to standards 20 which rise from the base 1. The arms 18 are swung back and forth by toggles 21 pivoted to the arms at 22, and at 23 to arms 24, which extend from a rock shaft 25 journalled on the standards 20 of the base frame above the pivots 19. Oscillation of the rock shaft 25 may be effected by two operating levers 26 secured to the shaft 25 at opposite ends of said shaft or opposite side of the machine.

With the end in view of uprighting the basket with the fruit therein, there is provided in connection with the apparatus an uprighting mechanism which, in this embodiment, comprises a support 27 in the form of a ring supported by arms 28 from a rock shaft 29 which is situated to one side of the confining means on the standards 20. This ring support is of a size to enter the support 3 for the facing member to occupy a position beneath said facing member during the facing of the fruit and the filling of the confining means. After the filling of the confining means, the placing of the basket or receptacle to be filled and the withdrawal of the confining means from the inverted filled basket, the support 27 is swung with the shaft 29 to upright the basket, the fruit being held in the basket at this time by the facing member which is held against the fruit.

The holding of the basket and the facing member together is effected, in this instance, by a swinging angled supporting member comprising an outer part having a flat surface 30 for engaging the bottom of the receptacle to be filled or packed, and two angled arms 31 engaging slidably or adjustably in sleeves 32 which are mounted to turn on the shaft 29. Bolts 33 serve to hold the arms 31 in adjusted positions in the sleeves 32 so as to accommodate baskets or receptacles of different sizes. The sleeves 32 are connected by a brace member 34 for engaging a side of the basket while the latter is swinging to upright position between the bottom support 30 and the facing member support 27.

With the end in view of locking the two supports 30 and 27, one against the bottom and the other against the facing member, a locking means is provided comprising, in this instance, a toothed member 35 secured to one of the arms 28 and engaged by a pawl 36 which is pivoted at 37 to one of the sleeves 32, and which by a link 38 pivoted thereto at 39, connects with a lever 40 which is pivoted at 41 to one of the sleeves 32. When the bottom engaging member 30 has been swung to upright the receptacle, its movement is stopped by a resilient stop device 42 in the form of an air cylinder having its piston provided with a stop bar 43 which is engaged by the arms 31 as the basket reaches the uprighted position. This stop bar also engages the lever 40 and shifts the pawl or detent 36 out of engagement with the toothed member 35, moving said pawl against the action of the spring 44 which tends to move the pawl to a position where the pawl will engage the toothed member 35.

In order that the shaft 25 and the levers 26 may continue to swing toward the left after the confining means has reached its lowest position and the basket has been clamped so that the operating arms or levers 26 may swing the basket clamping means to the right in a manner to be described, for the purpose of uprighting the basket, the toggles 21 provide a lost motion connection between the common operating shaft 25 for the shifting means of the confining means and the basket holding means. When the confining means is being raised and lowered, these toggles 21 are straight, but after the confining means reaches its lowest position, abutments 44ª on the toggles engage stops or abutments 45 on the uprights 20 and break the toggles, permitting the shaft 25 to continue its rotation to permit the uprighting of the basket.

There is a tendency for the user of the apparatus to jam the inverted basket on the confining means, and to prevent this action, a stop mechanism is provided for limiting the downward movement of the basket over the confining means. In this instance, two stops 46 are pivoted at 47 to the uprights 14 and, when in stop position, engage the lowermost portion or rim of the inverted basket. Springs 48 act on these stops to hold them in stopping position. Pivoted to both stops 47 at 49 are the ends of a U shaped yoke 50, the lower portion of which under lies the ring 7, so as the latter approaches its lowermost position due to the lowering of the confining means, the yoke will be engaged and will pull the stops 46 away from stop positions and permit the basket to be forced downwardly on the column of fruit or articles supported within the basket on the facing member 2. As soon as the confining means starts on its upward position, the yoke is released and the springs 48 move the stops 46 to stop positions.

In order to hold the confining means in its upper or confining position, a locking means may be employed comprising, in this instance, a latch 51 pivoted at 52 to the frame of the machine in a position to engage above one of the arms 26 to hold the latter in its lowered position at the right hand side of the machine. A spring 53 tends to move the latch away from latching position and an abutment 54 on the latch is adapted to engage the frame of the machine, due to the loose movement of the latch on its pivot, to hold the latch in latching position.

With the end in view of agitating the column of fruit or articles in the confining means or within the basket while the latter is inverted over the column, an agitating means is employed comprising a plate 55 underlying the facing member 2 within the ring 27 and arranged on the upper end of a rod 56 projecting upwardly from an arm 57 on a rock shaft 58 which may be vibrated by a pedal 59 extending laterally from the shaft 58.

For the purpose of swinging the facing member swinger 27 toward and from its position within the ring 3, a lost motion connection is provided between the shaft 25 and the rock shaft 29 to which said support is rigidly secured. This connection, in this instance, comprises a segmental gear 60 on the shaft 25 cooperating with a mutilated gear 61 on the shaft 29. This mutilated gear is substantially a complete circular gear except that it has a projection 62 extending from its periphery. When the confining means is in its lowest position, as shown in Figs. 2 and 3, the gear 60 lies in contact with the right hand side of the projection 62 and the facing member swinger 27 lies within the ring 3. The lever 26 at this time occupies the position shown in Fig. 3, and may be moved in either direction. Movement of the lever 26 to the left causes the facing support swinger 27 to swing to the right away from the confining means due to the projection 62 being first shifted and then the gears 60 and 61 meshing. The return movement of the lever returns the swinger 27 to its position within the ring 3 after which the lever will proceed to the right hand position independently of the shaft 29. Movement of the lever 26 to the right from the position shown in Fig. 3 to the position shown in Fig. 4, for the purpose of elevating the confining means, causes the gear 60 to move to the dotted line position shown in Fig. 11 where the gears 60 and 61 are out of mesh, so that the position of the swinger 27 is not changed.

The movement of the swinging receptacle or basket bottom engaging clamp is also effected through the shaft 25, and to this end, the shaft 25 carries a gear or sprocket wheel 63 which, by a chain 64, connects with a gear 65 on a sleeve 66 mounted to turn loosely on the shaft 29. Also carried by the sleeve 66 is a disk 67 from which projects laterally a cam or bevelled pin 68 adapted to engage with the rear or under face of an arm 68ª adjustable on the adjacent sleeve 32. The sleeve 66 with its disk 67 and gear 65 is axially movable on the shaft 29, and it is normally held by the spring so that the pin 68 is projected into the path of the arm 68ª. In order to move the sleeve or carrier 66 axially to move the pin 68 out of the path of the adjacent arm 68ª, a shifting device is employed. This shifting device comprises a segmental disk cam 69 on the sleeve 66 adapted to engage behind a roller 70 on a fixed part of the machine.

When the operating levers 26 are in the positions shown in Fig. 4, the column of fruit is supposed to be in the confining means and a basket is supported by the pawls 46 over the confining means, the pin 68 is in engagement with the arm 68ª (see Fig. 10). Movement of the levers 26 to the left causes the holding means for the bottom of the receptacle to swing until the plate 30 engages the bottom of the receptacle or basket, as shown in Fig. 5, and the confining means to be withdrawn from the basket. During this movement the pawl 36 rides over the toothed member 35 which is rigid with the shifter 27, so that the shifter and the bottom holder are locked together to clamp the basket or receptacle between them. When the confining means is lowered and the basket clamped by the uprighting means, the levers 26 occupy the intermediate position shown in Fig. 5. The levers 26 are swung further to the left, causing the basket engaging elements to travel together to carry the basket, the fruit therein and the facing member away from the confining means to an uprighted position, this being effected through the segmental gear 60 meshing with the gear 61. During this time, the toggle 21 breaks, and permits a lost motion of the levers relatively to the confining means and the holding member of the uprighting means is released by the projection 64. As the uprighting means reaches its uprighting position, the holding member is unlocked from the facing member support due to the operating lever 31 engaging the stop 43. On the swinging of the levers 26 to the right from the extreme left positions, the mutilated lost motion gear connections 60 and 61 return the facing member support 27 to its position at the center of the confining means independently of the holding member of the uprighting means until the levers again reach the positions shown in Fig. 3. At this time the facing member is placed on the support 3 over the support 27 being faced thereon or previously to being placed thereon. The levers 26 are now moved to the right again, to the position shown in Fig. 4, thus elevating the confining means, and, after the column of fruit is built up in the confining means on the faced facing member, the basket is fitted over the confining means and the operation is repeated.

In the embodiment of the invention shown in Figs. 13 and 14, another form of locking means for securing the holding member of the uprighting mechanism to the facing member support is shown. In this embodiment, on the shaft 29 is arranged a clutch disk 35$^a$ surrounded by a split clutch band 36$^a$ which is at one end secured at 37$^a$ to one of the sleeves 32 and at the other end is secured to a lever 36$^b$ pivoted at 36$^c$ to the sleeve 32. A link 38$^a$ is pivoted at 39$^a$ to the lever 36$^b$ and at the other end to a lever 40$^a$ which is pivoted at 41$^a$ to the basket holder. A spring 44$^a$ acts on the link 38$^a$ in such a manner as to close the clutch band 36$^a$ on the disk 35, but the eccentric connection between the lever 36$^b$ and the band 36$^a$ is such that the band can slip on the disk 35$^a$ when the basket holder is moved toward the confining means but will grip the disk 35$^a$ when the holder with the facing member support 27 are moved away from the confining means. As the lever 40$^a$ contacts with the stop 43 the disk 35$^a$ is released and the facing member support may be returned to the confining means independently of the basket holder.

What I claim as my invention and desire to secure by Letters Patent is:

1. The combination with a facing plate support, and a confining means for building a column of fruit on a facing plate on the support, of mechanism for raising and lowering the confining means comprising a pivotally mounted arm having connection with the confining means, a rock shaft, an arm on the rock shaft, a toggle connecting said arm with the pivotally mounted arm, and a device for breaking the toggle after the confining means has moved to its non-confining position; an uprighting means for the supporting plate and an inverted receptacle thereon, and a lost motion connection between the uprighting means and the rock shaft operating the uprighting means while the confining means is in non-confining position.

2. The combination with a support for a facing plate mounted to swing about an axis, and a holder for holding a receptacle to the support mounted to swing with and relatively to the support, about a common axis with the support, of locking means for causing the support and the holder to swing together comprising a toothed member concentric with said axis and swinging with the support, a locking pawl swinging with the holder, spring pressed means for holding said pawl away from the toothed member, and an abutment engaging said spring pressed means to hold the pawl away from the toothed member.

3. A fruit packer comprising a supporting frame, a support for a facing member, confining means movable upwardly from a lower position to provide for the building of a column of fruit on the facing member on the support, movable supporting means on the frame of the machine for engaging a receptacle fitted in an inverted position over the confining means to limit the downward movement of the receptacle over the confining means and means automatically operated by the confining means in the downward movement thereof for moving the receptacle supporting means out of engagement with the receptacle to permit the latter to be forced downwardly on the column of fruit.

4. A fruit packer comprising a support for a facing member, confining means movable upwardly from a lower position to provide for the building of a column of fruit on the facing member on the support, and movable supporting means for engaging a receptacle fitted in an inverted position over the confining means to limit the downward movement of the receptacle over the confining means, said movable supporting means comprising a plurality of movable stops for engaging the rim of the receptacle, and a common means for effecting the simultaneous movement of the stops.

5. A fruit packer comprising a supporting frame, a support for a facing member, confining means movable upwardly from a lower position to provide for the building of a column of fruit on the facing member on the support, and movable supporting means on the frame of the machine for engaging a receptacle fitted in an inverted position over the confining means to limit the downward movement of the receptacle over the confining means, said supporting means comprising pivotally mounted stops for engaging the rim of the inverted receptacle.

6. The combination with a facing plate support, and a confining means for building a column of fruit on a facing plate on the support, of mechanism for raising and lowering the confining means comprising a pivotally mounted arm having connection with the confining means, a rock shaft, an arm on the rock shaft, a toggle connecting said arm with the pivotally mounted arm, and a device for breaking the toggle after the confining means has moved to its non-confining position.

7. A fruit packer comprising a support for a facing member, confining means movable upwardly from a lower position to provide for the building of a column of fruit on the facing member on the support, and movable supporting means for engaging a receptacle fitted in an inverted position over the confining means to limit the downward movement of the receptacle over the confining means, and means controlled by the confining means effecting the movement of the receptacle supporting means to supporting position as the confining means moves to confining position, and away from supporting position as the confining means moves away from confining position.

8. The combination with a support for a facing member, a shaft to which said support is secured to swing the support to upright a facing member and an inverted receptacle thereon, of a holding member for cooperating with the bottom of a receptacle arranged in an inverted position on a facing member on the support, said holding member being mounted to swing on said shaft, an operating shaft, a lost motion connection between the operating shaft and the first named shaft for moving the support to and from supporting position and then to permit the operating shaft to move independently of the first named shaft, and a releasable connection between the holding member and the second mentioned shaft effective during the movement of the second mentioned shaft independently of the first mentioned shaft.

9. The combination with a pivotally mounted facing member support, and a holding member for holding a receptacle to a facing member on the support, of an operating member, a lost motion connection between the operating member and the facing member support to swing the latter in opposite directions, and to permit the facing member support to lie stationary while the operating member is moving independently thereof, and a connection between the operating member and the holding member effective during the time that the operating member is moving independently of the facing member support to bring the holding means into holding relation to the receptacle.

10. The combination with a facing member support and a holding member for holding a receptacle in an inverted position against a facing member on the facing member support, of a shaft to which the support is secured to turn therewith and on which the holding member is mounted to swing, a second shaft, a mutilated lost motion gear connection between the two shafts to swing the facing member in opposite directions and to free the latter from the action of the second shaft for independent movement of the latter, and a clutching device mounted to turn on the first mentioned shaft and operated from the second mentioned shaft to swing the holding member toward the support while the second shaft is turning in one direction relatively to the first shaft.

11. The combination with a facing member support and a holding member for holding a receptacle in an inverted position against a facing member on the facing member support, of a shaft to which the support is secured to turn therewith and on which the holding member is mounted to swing, a second shaft, a mutilated lost motion gear connection between the two shafts to swing the facing member in opposite directions and to free the latter from the action of the second shaft for independent movement of the latter, and a clutching device mounted to turn on the first mentioned shaft and operated from the second mentioned shaft to swing the holding member toward the support while the second shaft is turning in one direction relatively to the first shaft, said clutching device embodying an axially movable and rotary member on the first shaft, driven from the second shaft, a spring for moving said member axially into clutching relation, and a shifter for moving said member axially holding it out of clutching relation during the rotation of the first mentioned shaft.

12. The combination with a facing plate support, and a confining means for building a column of fruit on a facing plate on the support, of mechanism for raising and lowering the confining means comprising a pivotally mounted arm having connection with the confining means, a rock shaft, an arm on the rock shaft, a toggle connecting said arm with the pivotally mounted arm, and a device for breaking the toggle after the confining means has moved to its non-confining position, an uprighting means for the supporting plate and an inverted receptacle thereon, and a lost motion connection between the uprighting means and the rock shaft operating the uprighting means while the confining means is in non-confining position.

13. A fruit packer comprising a support for a facing member, confining means movable upwardly from a lower position to provide for the building of a column of fruit on the facing member on the support, and movable supporting means for engaging a receptacle fitted in an inverted position over the confining means to limit the downward movement of the receptacle over the confining means, said supporting means comprising pivotally mounted stops for engaging the rim of the inverted receptacle, a U shaped member connected to the stops and having a portion arranged in the path of the confining means to be moved by the latter on its descent to shift the stops away from supporting position, and spring means for returning said stops to supporting position as the confining means moves upwardly.

WILLIAM D. WRIGHT.